(12) United States Patent
Schwab

(10) Patent No.: US 6,229,502 B1
(45) Date of Patent: May 8, 2001

(54) ELECTRONIC BOOK

(75) Inventor: Bruce W. Schwab, Berkeley, CA (US)

(73) Assignee: Cylark Development LLC, Berkeley, CA (US)

( * ) Notice: Subject to any disclaimer, the term of this patent is extended or adjusted under 35 U.S.C. 154(b) by 0 days.

(21) Appl. No.: 09/185,233

(22) Filed: Nov. 3, 1998

(51) Int. Cl.[7] .............................. G09G 5/00; G09G 3/36; G06F 1/16
(52) U.S. Cl. .............................. 345/1; 345/901; 345/905; 345/87; 345/173; 361/681
(58) Field of Search .............................. 345/87, 901, 905, 345/104, 1, 173; 361/681, 686, 729, 730

(56) References Cited

U.S. PATENT DOCUMENTS

| | | | |
|---|---|---|---|
| 5,233,332 | 8/1993 | Watanabe et al. | 340/724 |
| 5,239,665 | 8/1993 | Tsuchiya | 395/800 |
| 5,463,725 | 10/1995 | Henckel et al. | 395/155 |
| 5,467,102 | 11/1995 | Kuno et al. | 345/1 |
| 5,534,888 | 7/1996 | Lebby et al. | 345/121 |
| 5,761,485 | 6/1998 | Munyan | 395/500 |
| 5,909,207 | * 6/1999 | Ho | 345/156 |

FOREIGN PATENT DOCUMENTS

PCT/US86/01768  8/1986  (WO) .............................. G06F/3/06

* cited by examiner

Primary Examiner—Richard Hjerpe
Assistant Examiner—Benjamin D. Bowers
(74) Attorney, Agent, or Firm—Townsend and Townsend and Crew LLP

(57) ABSTRACT

In a hand-held digital data reader which functions as an electronic book, a hinged housing for two displays and display controls opens and closes in the manner of a printed book. In the open position, the two displays are presented as facing pages of a book. Each display is mounted between a rounded spine end emulating the rounded page surface of an open printed book, and a tapered thumb pad emulating the tapered page ends of an open book. Thumb operated display controls are on the thumb pads. The hinge has a traveling pivot point for maintaining contact between the surfaces of the two spine ends when the book is opened and closed.

16 Claims, 5 Drawing Sheets

ELECTRONIC BOOK

BACKGROUND OF THE INVENTION

This invention relates to digital data readers and electronic books that emulate the attributes of a printed book, and more particularly, to electronic books that present to the reader the tactile feel, visual appearance, and general physical experience of reading a book that approximate that of a printed book.

Personal, hand-held digital data readers are known. Some have been devised as electronic books to function as substitutes for the printed book. These readers have attributes of a computer appliance. Known readers sometimes have a single display screen, but others may have two screens that substitute for the facing pages of a book. For example, U.S. Pat. No. 5,761,485 to Munyan discloses a personal electronic book system having a hinged electronic book with two touch-screen displays with touch control areas throughout the surfaces of the screens to control the display of information.

None of the known devices has found acceptance by book readers as a substitute for the printed book for use in common reading conditions, and in particular, none has been accepted as a book to curl up with, as the term is used by book readers.

It therefore would be desirable to have a digital data reader in the form of an electronic book that presents the reader with a reading experience that approximates that of reading a printed book.

SUMMARY OF THE INVENTION

According to the invention, a hand-held digital data reader, also termed an electronic book, is provided, and has visual, tactile, and operational attributes emulating the attributes of a printed book. Two displays are mounted in two hinged housings so as to open and close relative to each other, and present the reader with the effect of facing pages of a printed book. The screens display text and other material in the still position for reading, and also display the effect of turning pages and of leafing through pages at various speeds as controlled by the reader. When in the open position, the book may be held in one hand or in two hands with the hands and thumbs positioned in the positions commonly used by readers of printed books. The book is also operated with the hands substantially in the same positions. The displays are framed in the housings between a free end and hinged spine end. Each free end is formed as a thumb pad tapered in the manner of the tapered page edges of a printed book, so that when the book is open the thumb pads taper outwardly and rearwardly. The pads serve as resting places for the thumbs when held in the normal position for reading a book, and they also house the controls for controlling the presentation of material to the reader. The opposite spine end of the housing are rounded to simulate the rounded appearance of printed pages of an open book. In order to maintain the simulated appearance of the printed pages, the hinge structure connecting the left and right housings are constructed with a traveling pivot point so that the surfaces of the spine ends will maintain contact throughout the opening and closing of the book. The arrangement, dimensions and configuration of the parts of the book, the selection of materials, and the operational characteristics for controlling the presentation of reading material, all present to the book reader a close simulation of the experience of reading a printed book. The invention provides to the book lover and pleasure reader a substitute for the printed book that eliminates characteristics of known electronic readers which have rendered them unacceptable.

A desireable attribute of the printed book is that the reader always knows how much of the book has been read relative to that still to be read. Another embodiment of the invention adds an indicator of amount read, simulating the indication provided by the position of pages of the book. The indicator is presented as a part of the thumb pad so as not to appear on the same display as the material to be read.

The invention and objects and features of the invention will be more readily apparent from the following description and appended claims and drawings.

DESCRIPTION OF PREFERRED EMBODIMENTS

The drawings illustrate an electronic book that receives digital data containing the contents of various forms of printed publications, which for convenience will be referred to as "books", from a variety of data input sources. The electronic book is powered by an internal power source or by a battery source mounted on a removable mount for ready replacement. Two hinged displays open in the manner of two facing pages and display the contents in the still position for reading and also present effects of turning pages and leafing through pages as controlled by the reader.

The book is held in the manner of a printed book and operated by the thumbs while the book is held with the hands in their common book reading position. Controls are located adjacent to their common book reading position. Controls are located adjacent to rather than on the displays or pages. Information other than the contents of the publication to be read is eliminated from the display representing the page to the extent feasible, so the reader is presented with a replication of the printed page rather than a computer-like display. The manner of controlling the presentation of material, and the visual and textural characteristics of parts, are all selected to contribute to the book-like character of the invention, and present a reader with a reading experience approximating that of reading a printed book.

Figure 1:
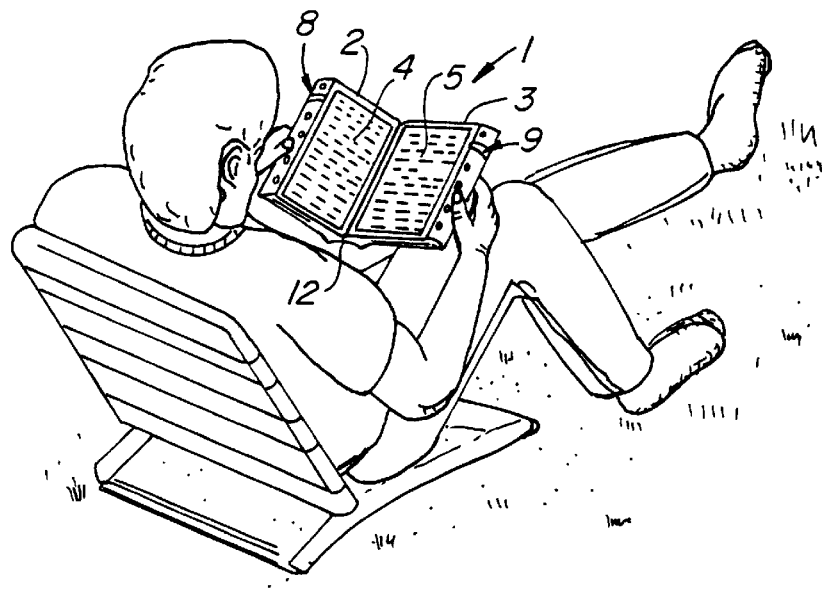
FIG. 1 is a pictorial view of the electronic book as positioned for use by a reclining reader.

Electronic book 1 is shown in FIG. 1 as positioned for use by a reader in the reclining position. Simulated facing pages of the book are provided by left display 4 and right display 5 mounted in left housing 2 and right housing 3, respectively, which are hinged to open in book-like fashion.

Figures 2A, 2B:
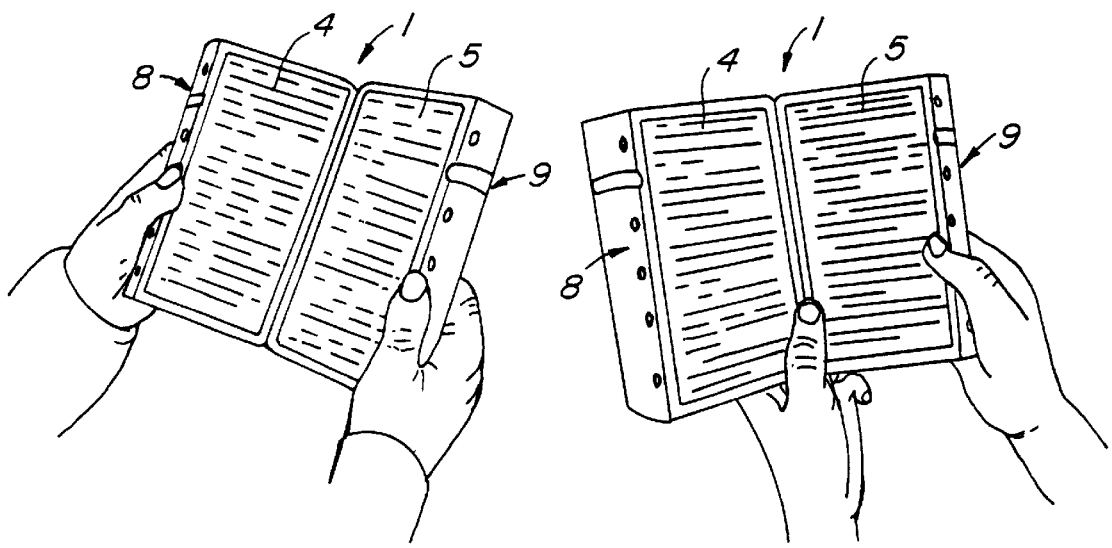
FIGS. 2(a), 2(b), and 2(c) are pictorial views of the electronic book, respectively showing the positions of the hands and thumbs of the reader, when reading while holding the book with two hands, when reading while holding the book with one hand, and when turning a page.
Figure 2C:
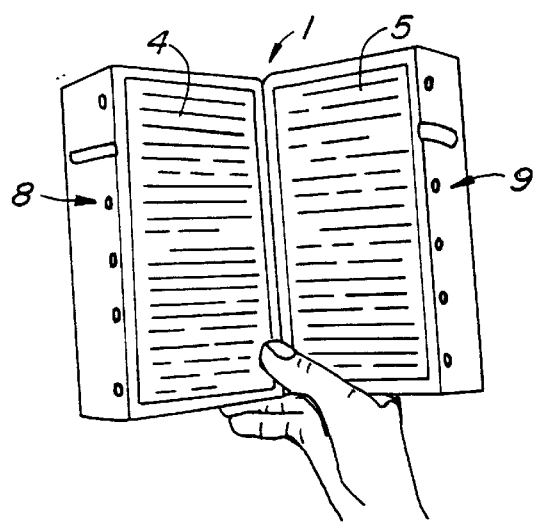

When reading the book while holding it with two hands, readers rest their thumbs on left thumb pad 8 and right thumb pad 9 with thumbs located in positions commonly used while reading, books. FIG. 2(a) shows the positioning of the thumbs when the book is held in two hands both during reading and controlling presentation of material. In FIG. 2(b), the left hand is in common book supporting and opening position, and the right hand is in the common position used during reading, but also for controlling displayed material. The book is held in the common one-handed book supporting and opening position in FIG. 2(c).

Figure 3:
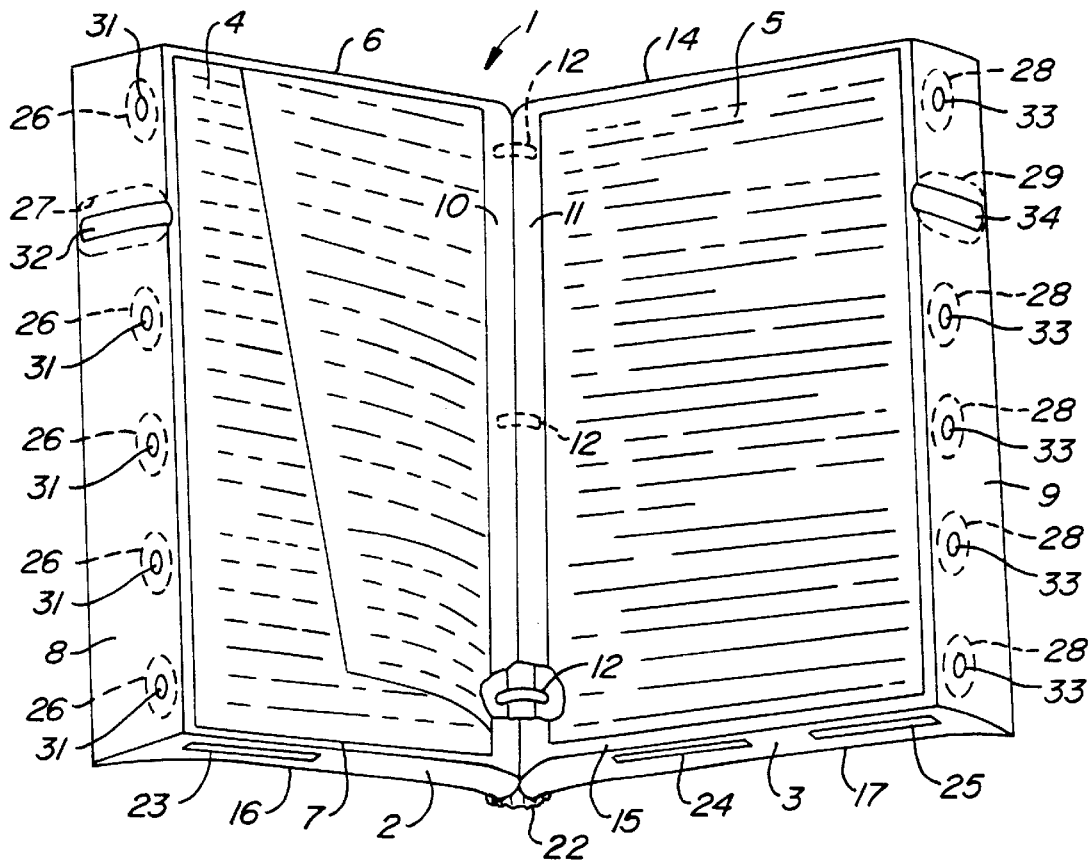
FIG. 3 illustrates the electronic book in the open position.

As best seen in FIG. 3, left housing 2 and right housing 3 are connected by a hinge means 12. Left housing 2 has upper frame portion 6 and lower frame portion 7, while right housing 3 has upper frame portion 14 and lower frame portion 15. Opposite left thumb pad 8 at the outer free end of housing 2 is an inner spine end 10. Right housing 3 has a corresponding spine end 11. Displays 4 and 5 are bounded by the upper and lower frame portions, outer thumb pads and inner spine ends. Thumb pads 8 and 9 are tapered outwardly and rearwardly to resemble the tapered page ends of an open printed book, and spine end portions 10 and 11 are rounded to resemble the rounded appearance of bound book pages in the open position. Thumb pads 8 and 9 may also be convexly curved along their longitudinal axes for further resembling page ends. Each housing has an outer wall, left wall 16 on housing 2, and right wall 17 on housing 3, which may be formed with slight concave curvature as shown, to emulate the shape of a paper-back book.

Hinge means 12 preferably maintains the surfaces of rounded spine end portions 10 and 11 in contact throughout opening and closing of the book, to maintain the appearance of the printed page. As seen in FIGS. 3 and 5, the hinge means may include a plurality of springs 13, or other elastic connectors which are anchored in cavities 19 and span the rounded inner end surfaces 18 in sufficient tension to hold the ends together. The structure provides a traveling pivot point best illustrated in FIG. 4 for maintaining contact between the rounded ends during opening and complete closing of the book.

Figure 4:
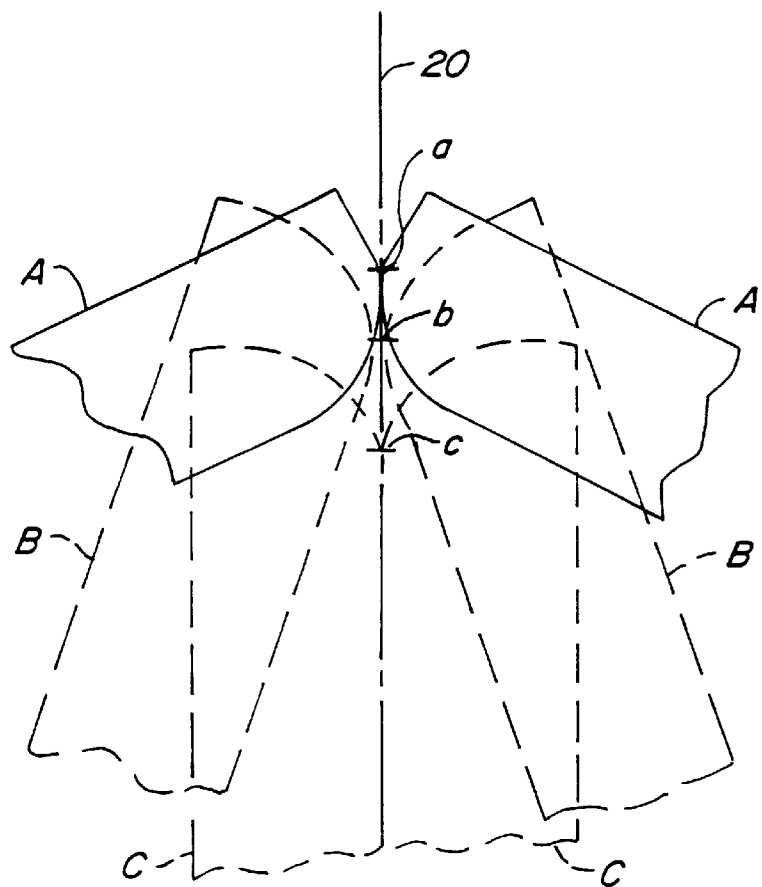
FIG. 4 is a diagram illustrating the traveling hinge pivot point.
Figure 5:
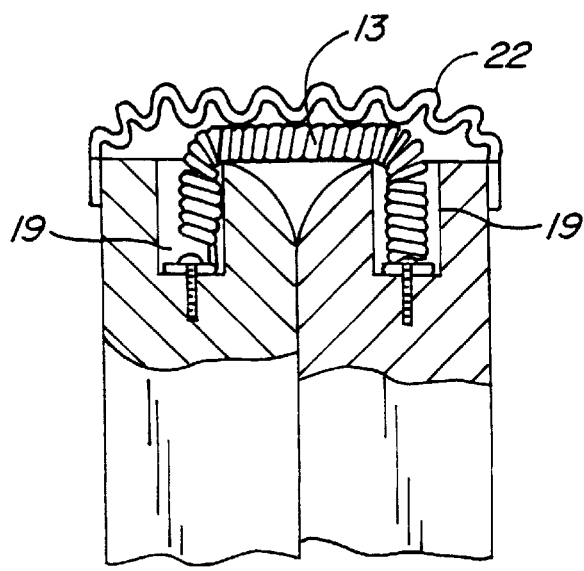
FIG. 5 is a detailed view of the hinge structure in the closed position.

FIG. 4 shows the movement of the pivot point along contact line 20 which diagrammatically represents a pivot plane. In an open book position A the pivot point is located at point a. In a more closed position B, shown in broken line, the pivot point moves inwardly to position b. When the book is in the completely closed position C, as shown in dotted line, the pivot point moves to position c.

Housings 2 and 3 may be constructed of metal, such as aluminum, which provides electromagnetic interference shielding. Other materials, such as plastics with interior coating for shielding, may be used. Electronic components are mounted within the housings in conventional fashion. Surface finishes, including for the surfaces of thumb pads 8 and 9, are selected to provide a textural feel that replicates the sensation of holding a printed book. The displays may be active matrix LCD, utilizing thin film transistors (TFT) technology, passive matrix LCD using CSTN technology, hybrid passive display (HPD) LCD, high-performance addressing (HPA) LCD, or other displays having low power requirements and viewing characteristics suited to use in electronic books.

Figure 6:
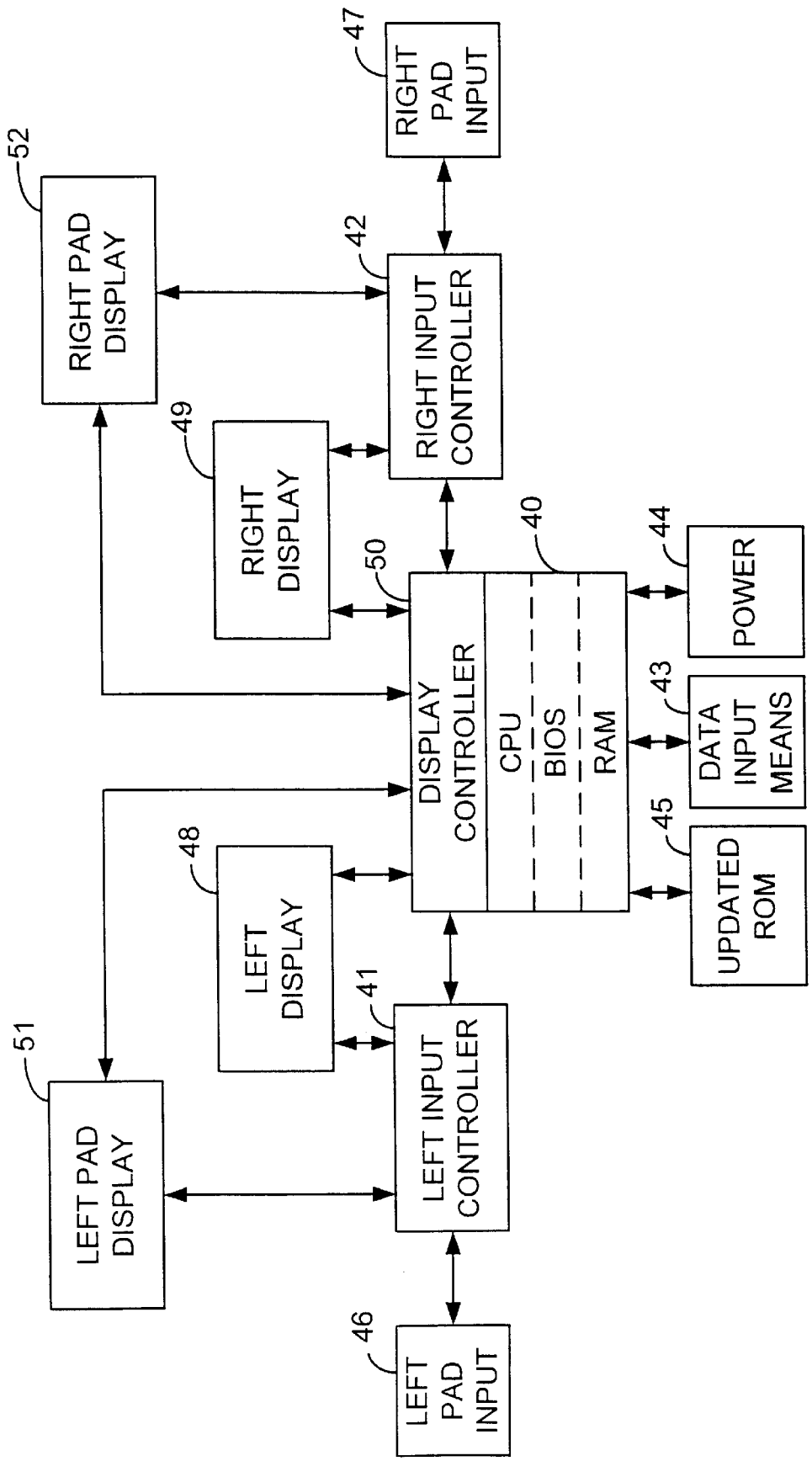
FIG. 6 is a block diagram of the digital data processing circuitry of the electronic book.

The surface of left thumb pad 8 has a plurality of touch control areas 26 and a leafing touch control area 27 electronically connected through left pad input 46 to left input controller 41 of the digital data processing means shown as system 40 in the schematic diagram in FIG. 6. Thumb pad 9 has corresponding touch control areas 28 and leafing touch control area 29 connected through right pad input 47 to right input controller 42; all the control elements being for the purpose of enabling the reader to control the presentation of material on the displays by action of the thumbs on the thumb pads. Left pad input 46 includes conventional touch sensitive input keys 31 associated with control areas 26 and adjusted to respond to slight thumb pressure. Pad input 46 also includes control 32 associated with left leafing touch control area 27 to enable the reader to control motion of displayed material by movement of the thumb and also to perform a "click" function by slight tapping by the thumb. Control 32 may be a touch pad such as a capacitance-based touch pad with features available from companies such as Synaptics and Cirque Corporation, a resistive membrane touch pad or other touch pad or trackball device or the like. Touch control areas 26 are touched to control such actions as display of book title pages for selection of books, page forward, first page display, book marking, and others if desired. The left thumb is moved outwardly along the surface of left leafing touch control area 27 at different speeds to control the speed of simulated forward leafing through pages of the displayed material, and the thumb is moved inwardly to control rearward leafing. Control of presentation of material on the right display 5 is accomplished with corresponding elements, including right input keys 33 and right touch pad 34.

The digital data processing means shown in FIG. 6 serves to process digital data input with book material content and to process reader commands. The processing means includes an embedded microcomputer system 40 with customized operating system software controlling a CPU, BIOS, ROM, and a RAM providing main memory and computing capability. The microprocessor for the microcomputer system may be a generally available microprocessor chip of sufficient speed, available from such companies as Intel and AMD. A power source 40, preferably a rechargeable battery source powers the electronic book. It may be mounted internally within one of the housings 2 and 3 and connectable to a conventional AC adapter and charger, or it may be mounted on a removable mount for insertion into the electronic book through power slot 25 (FIG. 3). The battery source may be lithium ion batteries, nickel hydride batteries or other batteries used in mobile computing.

Data constituting the content of books to be digitally processed and displayed is inputted through data input means 45. In order to afford the book reader the familiar experience of browsing and shopping at a book store, the data input means preferably takes the form of generally available data memory devices such as Small PC Cards meeting PCMCIA standards or other memory storage cards encoded with book content and placed on sale at stores selling books. The removable data storage devices are insertable through slot 23. Alternatively, data may be received by connection to telephone lines, downloaded from computers, or received from wireless sources of digital information. As received, the data may represent content as composited and in the form appearing on the printed page or it may represent content transformed by customized software for processing only by the electronic book of this invention. Data from input means 45, which may be data transferred from the removable memory storage card, is stored in an updateable ROM 45, inserted in slot 24. ROM 45 may take the form of PCMCIA memory storage cards, EEPROMS, flash memory, or other memory devices having storage capacity for data representing a number of printed books. To control presentation of inputted data, a display controller 50 receives information from microcomputer system 40 and transmits the information to left display 4 and right display 5. Also, a book reader controls display of material through left thumb pad input 46 and right pad input 47 to transmit information through left input controller 41 and right input controller 42 to the corresponding displays.

In the preferred embodiment of the electronic book, the book is opened to open the control circuitry and present material that is inputted through input means 43. If the reader previously has touched a control area to cause a bookmark function, the bookmarked pages are displayed. When there has been no bookmark, the display screens display title pages of books or other information to enable the reader to use the thumb to select a book by touching the control area associated with the book selection function. The reader may use the left thumb to display the first page of the selected book by touching the associated touch control area on the left thumb pad 8, and use the right thumb on the right thumb pad 9 to display the last page. When reading the book, the reader uses the left thumb to present a simulation of turning one page forward by touching the associated touch control area. The page can also be turned one page backward by touching the associated touch control area on the right thumb pad. The left thumb is used to touch the left leafing touch control area 27 to present simulated forward leafing and simulated rearward leafing through the book at a speed controlled by the speed of movement of the thumb. Forward leafing results from thumb movement from the inner end of the thumb pad toward the outer end, and movement in the opposite direction results in simulated rearward leafing. On the right thumb pad 9, rearward leafing is simulated by outward movement of the right thumb, and forward leafing results from inner movement. A page may be bookmarked by touching the associated touch control area. The turning of the pages and other functions are performed while the hands and thumbs are in the positions normally used to hold a printed book while reading.

Figure 7:
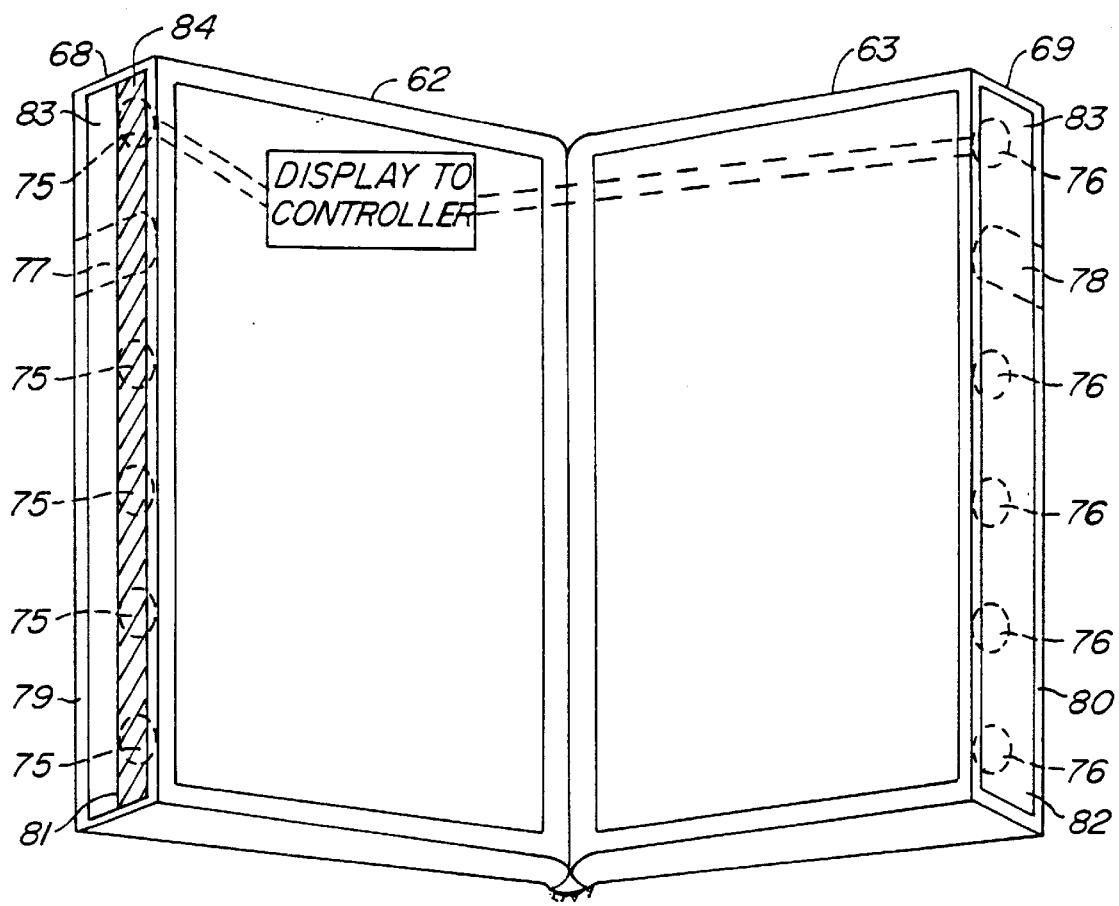
FIG. 7 is a detailed view of a second embodiment of the thumb pad with a place indicator display.
Figure 8A:
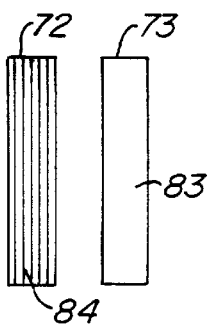
FIG. 8 is a diagram illustrating presentation of the place indicator display in different states.
Figure 8B:
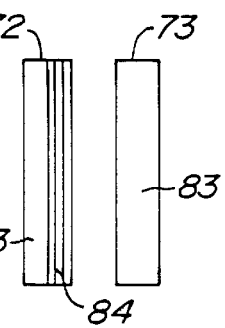
Figure 8C:
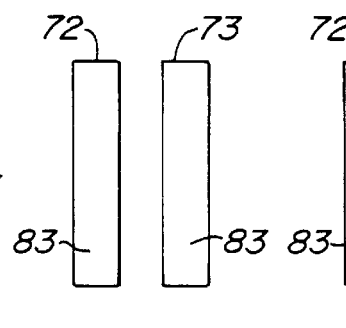
Figure 8D:
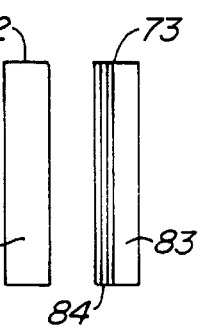

In an alternate embodiment of the electronic book, the thumb pads incorporate means for indicating the amount read relative to the amount to be read in a complete book, and for doing so in a manner emulating the corresponding attribute of the printed book. FIG. 7 illustrates one specific embodiment, in which tapered left thumb pad 68 and tapered right thumb pad 69 are associated with left housing 62 and right housing 63, respectively. Thumb pad 68 has a pad wall 79, and thumb pad 69 has a pad wall 80, each pad wall being formed of a transparent or translucent plastic material, such as PLEXIGLAS plastic or acrylic plastic. Thumb pads 68 and 69 each have touch control areas 75 and 77, and leafing control areas 76 and 78 corresponding to touch control areas 26, 28 and leafing control areas 27, 29 of the embodiment of FIG. 3. A left pad display 81 is mounted under wall 79, and right display 82 is mounted under wall 80. The displays, which may be LCD type displays, are positioned and sized to be viewed through pad walls 79 and 80 and to present information occupying substantially the entire length and height of the pad walls. The displays each present two bands running the length of the displays, a light colored or white band and a dark colored band, such as light band 83 and dark band 84 in FIG. 7. During the course of their presentation, the bands will vary in width relative to each other to indicate how much has been read. In order to understand the use of the bands it is desirable to refer to attributes of a printed book. When a book is open and the reader is at the beginning of a book, there are no pages or few pages at the left side of the book, and all or most pages are at the right side. As the book is read, the stack of pages and page ends increases at the left side and decreases at the right side until all are at the left side. In this invention, the light colored band denotes the appearance of a stack of page ends, and the dark band denotes the absence of page ends, and the relative width of the two changes as the book is read to simulate the positions of the page ends. The presentation of the bands in displays 72, 73 is controlled by the microcomputer system 40 (FIG. 6), specifically through display controller 50, left input controller 41, and right input controller 42, so that presentation of the bands is synchronized with the presentation of material to be read. Examples are illustrated in FIGS. 8(a) through 8(d). The width of a stack of page ends is denoted by the width of light band 83 relative to dark band 84. In FIG. 8(a), the narrow band 83 indicates that the reader is at the beginning of the book. The band 83 in FIG. 8(b) indicates that the reader has read one quarter of the book. No dark band 84 is displayed when the reader has read one-half of the book as in FIG. 8(c), and in FIG. 8(d) band 83 indicates the reader has completed three-quarters of the book. The indicators in thumb pads 68 and 69 give an indication of the portion completed in the manner of a printed book without adding extraneous information on the face of the page displays presenting the contents of the book.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. In an electronic book comprising a left housing and a right housing connected by a hinge means for opening and closing in the manner of a printed book, a left display on said left housing and right display on said right housing disposed in the manner of facing pages of a printed book for displaying contents of printed material, data input means for inputting data representing the contents of printed material, data processing means for processing said data, control means for operation by a reader to control presentation of said data on said displays, and a power source, the improvement comprising:

a left thumb pad extending the full length of the free outer end of said left housing; and a right thumb pad extending the full length of the free outer end of said right housing;

both of said thumb pads being disposed for placement of the thumbs on said thumb pads by said reader in the positions commonly used by readers of printed books while reading printed books;

said left housing having an inner spine end portion opposite said left thumb pad;

said right housing having an inner spine end portion opposite said right thumb pad;

said left portion and said right end portion being rounded in the manner of the rounded pages of an open printed book; and said hinge means has a traveling pivot point and maintains contact between the rounded inner spine end portions of said left housing and said right housing throughout said opening and closing in the manner of a book.

2. The electronic book of claim 1, wherein both said left thumb pad and said right thumb pad are tapered outwardly and rearwardly relative to the front of said displays in the manner of the tapered page ends of an open printed book.

3. The electronic book of claim 2, wherein said left thumb pad and said right thumb pad are convexly curved around a longitudinal axis.

4. The electronic book of claim 2, wherein said control means is on both said thumb pads.

5. The electronic book of claim 4, wherein said data processing means includes software means having:
 a routine for presenting a simulation of paging one page forward on said displays;
 a routine for presenting a simulation of paging one page backward on said displays;
 a routine for presenting a simulation of leafing pages forwardly on said displays;
 a routine for presenting a simulation of leafing pages backwardly on said displays; and
 the presentation of said simulations being controlled by operation of said control means by said reader.

6. The electronic book of claim 5, wherein said control means is disposed for operation by said reader with the thumbs while the thumbs are in positions commonly used by readers of printed books while reading said books.

7. The electronic book of claim 6, wherein:
 said control means for controlling presentation of said simulation of turning one page forward is on said left thumb pad;
 said control means for controlling presentation of said simulation of turning one page backward is on said right thumb pad; and
 said control means for controlling presentation of said simulations of leafing pages forwardly and leafing pages backwardly is on both said left thumb pad and said right thumb pad and controls presentation of said simulations responsive to the speed of movement of the thumbs of the reader and the directions of movement of the thumbs of the reader across either said left thumb pad or said right thumb pad.

8. The electronic book of claim 1, wherein said hinge means comprises a plurality of extensible elements disposed at intervals along said spine end portions for spanning the end surfaces of said spine end portions.

9. The electronic book of claim 4, wherein said data input means is a data memory storage device.

10. The electronic book of claim 4, wherein said data input means is a small PC card.

11. The electronic book of claim 1, wherein said left thumb pad and said right thumb pad each has a place indicator means for indicating how much of a book being displayed has been read relative to the portion to be read to complete the book;
 said place indicator means comprising a display synchronized with the presentation of the contents of a book being read.

12. The electronic book of claim 11, comprising:
 a left pad display mounted within the interior of said left thumb pad;
 a right pad display mounted within the interior of said right thumb pad;
 pad display controller means for said left and right pad displays in said data processing means;
 a left wall portion on said left thumb pad and right wall portion on said right thumb pad extending the length of said pads and formed of a light passing material to permit said reader to view said left pad display and said right pad display through said wall portions;
 said left pad display and said right pad display presenting to said reader the display of two bands of contrasting color extending the full length of the said wall portions and varying in width responsive to said pad display controller means according to the extent of completion of display of the contents of said book being read.

13. A method for presenting digital data representing the contents of a printed book on a pair of displays mounted on a hinged pair of housings connected with hinge means in a manner simulating the facing pages of a printed book in an electronic book, each of said housings having an inner spine end portion rounded in the manner of the rounded pages of an open printed book and said housings having a free outer end portion said hinge means having a traveling pivot point for maintaining contact between the rounded inner spine end portions throughout opening and closing of said electronic book, said electronic book having input means for said data, data processing means for creating the effects of turning pages and leafing through pages at different speeds on said displays, and control means operable by a reader for controlling presentation of said data, comprising the steps of:
 placing the thumbs of both hands on the free outer ends of said housings and opening said electronic book by opening said housings relative to each other while maintaining contact between said rounded inner spine portions at said traveling pivot point throughout said opening;
 placing the thumb of one hand on an area of said control means located at the free outer end portion of one of said housings in a position commonly used for holding an open printed book; and
 applying pressure with the thumb in said position to cause presentation of the effect of turning one page on said displays.

14. The method of claim 13, comprising the steps of:
 placing said thumb on a second area of said control means located at said free outer end portion in a second position commonly used for holding an open printed book; and
 moving said thumb in a direction along said area to cause the effect of leafing pages on said displays.

15. The method of claim 14, comprising the steps of:
 placing the thumb of the other hand on an area of said control means located at the free outer end portion of the other one of said housings in a position commonly used for holding an open printed book;
 applying pressure with the thumb of said other hand in said position to cause presentation of the effect of turning one page on said displays;
 placing the thumb of said other hand on a second area of said control means located at the free outer end portion of said other one of said housings in a second position commonly used for holding an open printed book; and
 moving said thumb of said other hand in a direction along said area to cause the effect of leafing pages on said displays.

16. The method of claim 15, comprising the step of moving the thumb on said second area on at least one of said housings in opposite directions and at different speeds to cause the effect of leafing through pages on said displays in directions and at speeds dependent on the direction and speed of movement of said thumb.

\* \* \* \* \*